United States Patent
Kong et al.

(10) Patent No.: US 8,336,310 B2
(45) Date of Patent: Dec. 25, 2012

(54) VARIABLE TURBOCHARGER AND CONTROL METHOD FOR THE SAME

(75) Inventors: Jin Kook Kong, Suwon (KR); Soo Hyung Woo, Yongin (KR); Young Nam Kim, Seongnam (KR); Young Jin Won, Hwaseong (KR); Young-Ju Kim, Hwaseong (KR); Jin Wook Son, Gunpo (KR); Jeong-Hwa Cha, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/253,560

(22) Filed: Oct. 5, 2011

(65) Prior Publication Data

US 2012/0017586 A1    Jan. 26, 2012

Related U.S. Application Data

(62) Division of application No. 12/275,026, filed on Nov. 20, 2008.

(30) Foreign Application Priority Data

Feb. 1, 2008 (KR) .................. 10-2008-0010787

(51) Int. Cl.
*F02D 23/00* (2006.01)
(52) U.S. Cl. ......... 60/605.1; 60/602; 415/151; 415/148; 415/150; 415/159; 415/205
(58) Field of Classification Search .............. 60/600, 60/601, 602, 605.1; 415/151, 148, 150, 159, 415/160, 205
See application file for complete search history.

(56) References Cited

U.S. PATENT DOCUMENTS

| 4,389,845 A | 6/1983 | Koike |
| 6,073,447 A | 6/2000 | Kawakami et al. |
| 2007/0227142 A1* | 10/2007 | Blaylock et al. ............... 60/600 |

FOREIGN PATENT DOCUMENTS

| DE | 3831687 A1 | 3/1990 |
| FR | 2 780 445 A1 | 12/1999 |
| GB | 2 031 069 A | 4/1980 |
| GB | 2 062 116 A | 5/1981 |
| GB | 2 105 789 A | 3/1983 |
| JP | 57-24402 A | 2/1982 |
| JP | 2000-8868 A | 1/2000 |
| JP | 2004-92481 A | 3/2004 |
| JP | 2007-192128 A | 8/2007 |

* cited by examiner

*Primary Examiner* — Quyen Leung
*Assistant Examiner* — Leda Pham
(74) *Attorney, Agent, or Firm* — Morgan, Lewis & Bockius LLP (57) ABSTRACT

A variable turbocharger including a turbine housing, a first scroll fluidly communicating with a turbine, a second scroll formed along an outside of the first scroll, wherein the first scroll and the second scroll are disposed within the turbine housing for exhaust gas to exhaust through the turbine, a partitioning unit for selectively separating the first scroll and the second scroll, and a a flux control valve disposed at the exhaust gas inflow portion and selectively coupled to the partitioning unit for blocking the exhaust gas from flowing into the second scroll. The variable turbocharger may prevent turbo lag at a low speed and be highly efficient at a high speed.

6 Claims, 12 Drawing Sheets

VARIABLE TURBOCHARGER AND CONTROL METHOD FOR THE SAME

CROSS-REFERENCE TO RELATED APPLICATION

This application is a Divisional of U.S. patent application Ser. No. 12/275,026 filed Nov. 20, 2008, which claims priority to Korean Patent Application No. 10-2008-0010787, filed on Feb. 1, 2008, the entire contents of which are incorporated herein for all purposes by this reference.

BACKGROUND OF THE INVENTION

1. Field of the Invention

The present invention relates to a variable turbocharger and a control method for the same. More particularly, the present invention relates to a variable turbocharger and a control method for the same that may prevent turbo lag at a low speed and be highly efficient at a high speed.

2. Description of Related Art

In a conventional internal combustion engine, negative pressure generated during an intake stroke induces a mixture of air into a cylinder. This is called natural aspiration or normal aspiration. However, a valve opened time is too short to sufficiently intake the air mixture, so forcible pumping is used for enhancing the volume effect of a cylinder, effective pressure ratio, and explosion pressure, thereby improving output. This is called turbocharging, and an apparatus for turbocharging is called a turbocharger.

Figure 1:
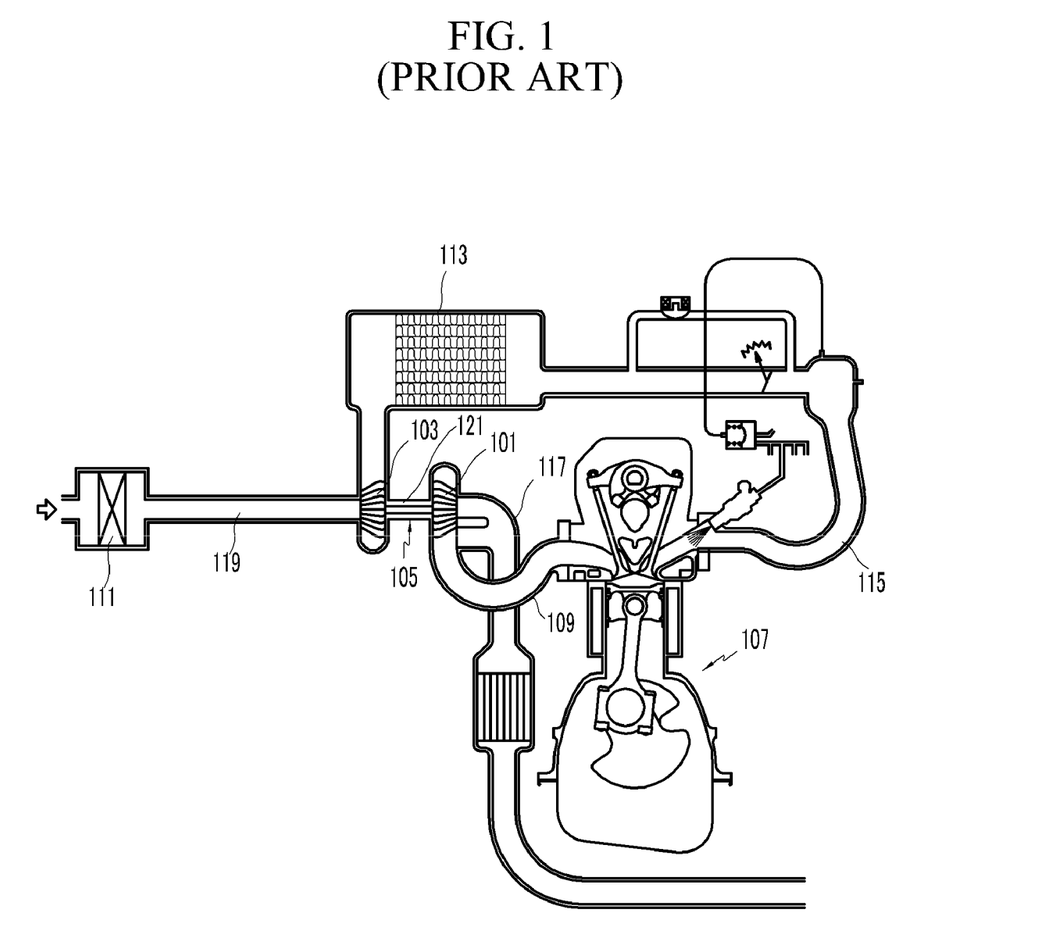
FIG. 1 is a schematic diagram of a conventional turbocharger.

A conventional turbocharger 105, as shown in FIG. 1, includes a turbine 101 and a compressor 103, and is connected with an exhaust manifold 109 of an engine 107 for receiving exhaust gas.

The compressor 103 intakes air from an air cleaner 111 via an intake pipe 119, and the air is cooled in an intercooler 113 and supplied to the engine 107 via an intake manifold 115.

The turbine 101 is connected with an exhaust pipe 117 exhausting the exhaust gas.

Thus, rotation of the turbine 101 induced by the exhaust gas of the engine 107 turns the compressor 103 connected with the turbine 101 by a shaft 121 and the cooled and compressed air is supplied from the air cleaner 111 to the intake manifold 115.

Figure 2:
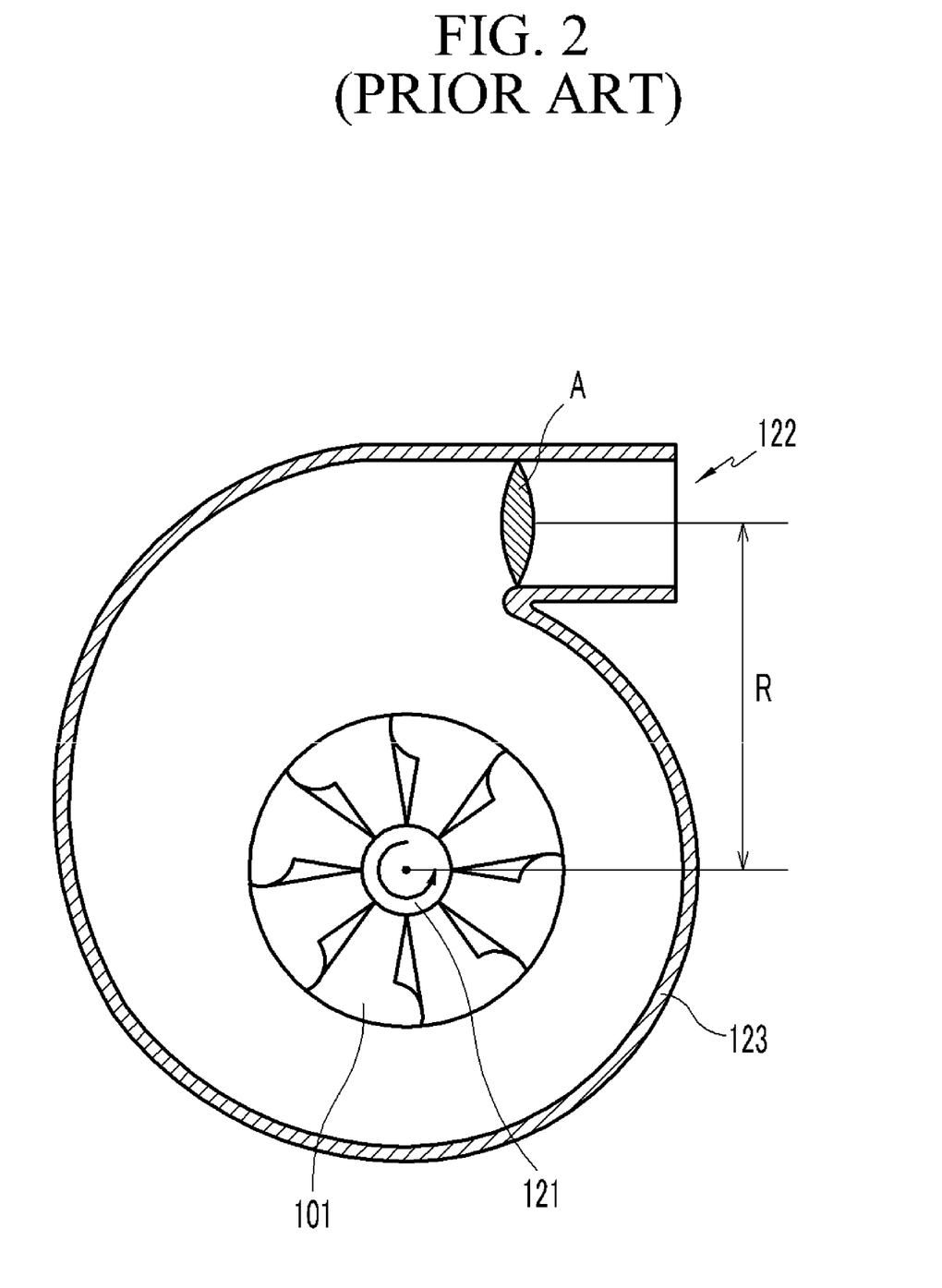
FIG. 2 is a partial cross-section of the conventional turbocharger of FIG. 1.

FIG. 2 shows a partial cross-section of a conventional turbocharger, and shows a turbine housing 123 provided with an inlet 122 into which the exhaust gas flows.

The turbine 101 that is connected with the compressor 103 by a shaft 121 is disposed within the turbine housing 123.

The characteristics of the turbine 101 are determined by an A/R ratio, wherein A indicates a cross-section of the inlet 122, R indicates a distance between the center of the turbine 101 and the center of the cross-section of the inlet 122, and the A/R ratio means a value of A divided by R. If the A/R ratio is small, the turbine 101 is sensitive to acceleration and resisting force to exhaust tends to be increased at a high speed.

A conventional A/R ratio is 0.5-1.0. The lower the A/R ratio, the faster the turbocharging is at low RPM, but performance is deteriorated at high RPM.

That is, when the A/R ratio is high, turbo lag may be occurred at low RPM, however output is improved at high RPM.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention have been made in an effort to provide a variable turbocharger and a control method for the same that may prevent turbo lag at low speed and may be highly efficient at high speed.

A variable turbocharger according to various aspects of the present invention may include a turbine housing, a first scroll fluidly communicating with a turbine, a second scroll formed along an outside of the first scroll, wherein the first scroll and the second scroll are disposed within the turbine housing for exhaust gas to exhaust through the turbine, a partitioning unit for selectively separating the first scroll and the second scroll, and a flux control valve disposed at the exhaust gas inflow portion and selectively coupled to the partitioning unit for blocking the exhaust gas from flowing into the second scroll.

In various embodiments, the partitioning unit includes a scroll partition that selectively separates the turbine housing between the first scroll and the second scroll, and a partition controlling unit for driving the scroll partition. The partition controlling unit may include a guide unit configured to guide the scroll partition, and a controlling link connected with the scroll partition and configured to move the scroll partition along the guide unit. The controlling link may include a first lever pivotally coupled to the scroll partition, a second lever connected with the first lever, and a third lever connected with the second lever. The scroll partition may be configured to move based on an operation of the third lever.

In various embodiments, the partition controlling unit includes an inclined unit disposed under the scroll partition, and a drive lever moving along the inclined unit thereby causing the scroll partition to move. The scroll partition may include an elastic portion for supplying restoring force. The partition controlling unit may include a rack connected to the scroll partition, and a drive gear engaged with the rack, wherein the drive gear drives the rack. The scroll partition may be disposed such that cross-sections of the first scroll and the second scroll decrease along an inflow direction of the exhaust gas. The partitioning unit may include a scroll partition that selectively separates the turbine housing with the first scroll and the second scroll, and a partition controlling unit for driving the scroll partition.

Various aspects of the present invention are directed to a control method for a variable turbocharger including a control method for a variable turbocharger including detecting vehicle information, determining an exhaust gas inflow mode based on the vehicle information, opening/closing a flux control valve, and opening/closing a scroll partition.

The detecting of the vehicle information may include detecting at least one of vehicle speed, throttle opening, acceleration, and accelerator pedal angle. The exhaust gas inflow mode may include a first mode in which exhaust gas flows through a first scroll, and a second mode in which exhaust gas flows through the first scroll and a second scroll. The opening/closing of the flux control valve may selectively blocks exhaust gas from flowing into the second scroll. The opening/closing of the scroll partition may selectively separates the first scroll and the second scroll. The opening/closing of the scroll partition and the opening/closing of the flux control valve may be simultaneously executed.

The opening/closing of the scroll partition may be executed with a partition controlling unit for opening/closing the scroll partition. The partition controlling unit may include a first lever pivotally coupled to the scroll partition, a second lever connected to the at least a first lever, and a third lever connected to the second lever, wherein the scroll partition is opened/closed by rotation of the third lever. The opening/closing of the scroll partition may be executed with a partition controlling unit for opening/closing the scroll partition. The partition controlling unit may include at least a first lever pivotally coupled to the scroll partition, a second lever pivotally connected with the at least a first lever, and a third lever pivotally connected with the second lever, wherein the scroll partition is opened/closed by rotation of the third lever. The opening/closing scroll partition may be executed with a partition controlling unit for opening/closing the scroll partition. The partition controlling unit may include a rack disposed under the scroll partition, and a drive gear engaged with the rack, wherein the scroll partition is opened/closed by rotation of the drive gear.

As described above, a variable turbocharger and a control method for a variable turbocharger according to various aspects of the present invention that may prevent turbo lag at low speed and may be highly efficient at high speed with a sufficient cross-section of an inlet for exhaust gas is provided.

The variable turbocharger and the control method for a variable turbocharger according to exemplary embodiments of the present invention may prevent exhaust gas leaks and resistance at low speed and may prevent wasting energy at high speed without obstacles in a scroll.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 3:
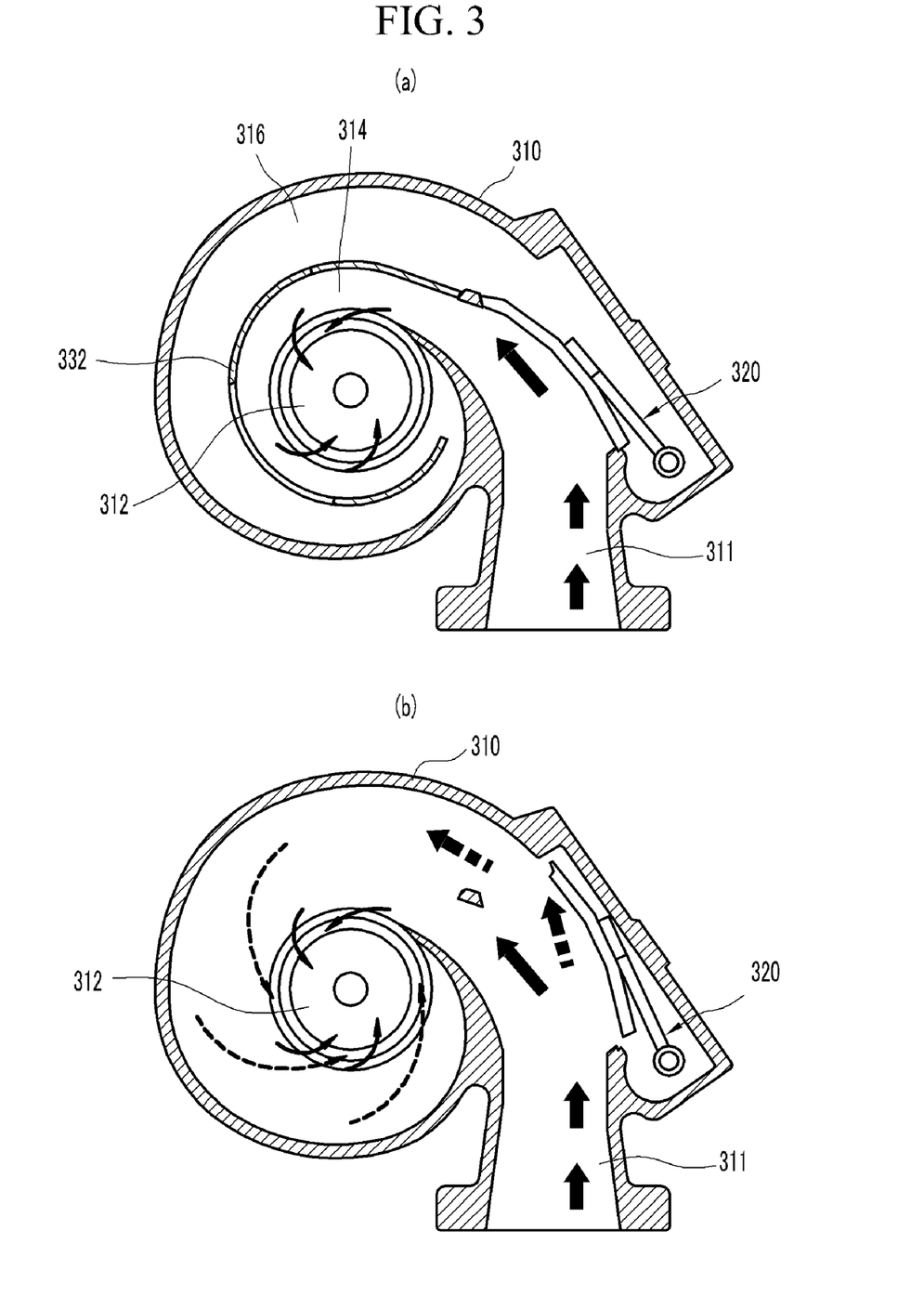
FIG. 3 shows operations of an exemplary variable turbocharger according to an aspect of the present invention at low speed and high speed.
Figure 4A:
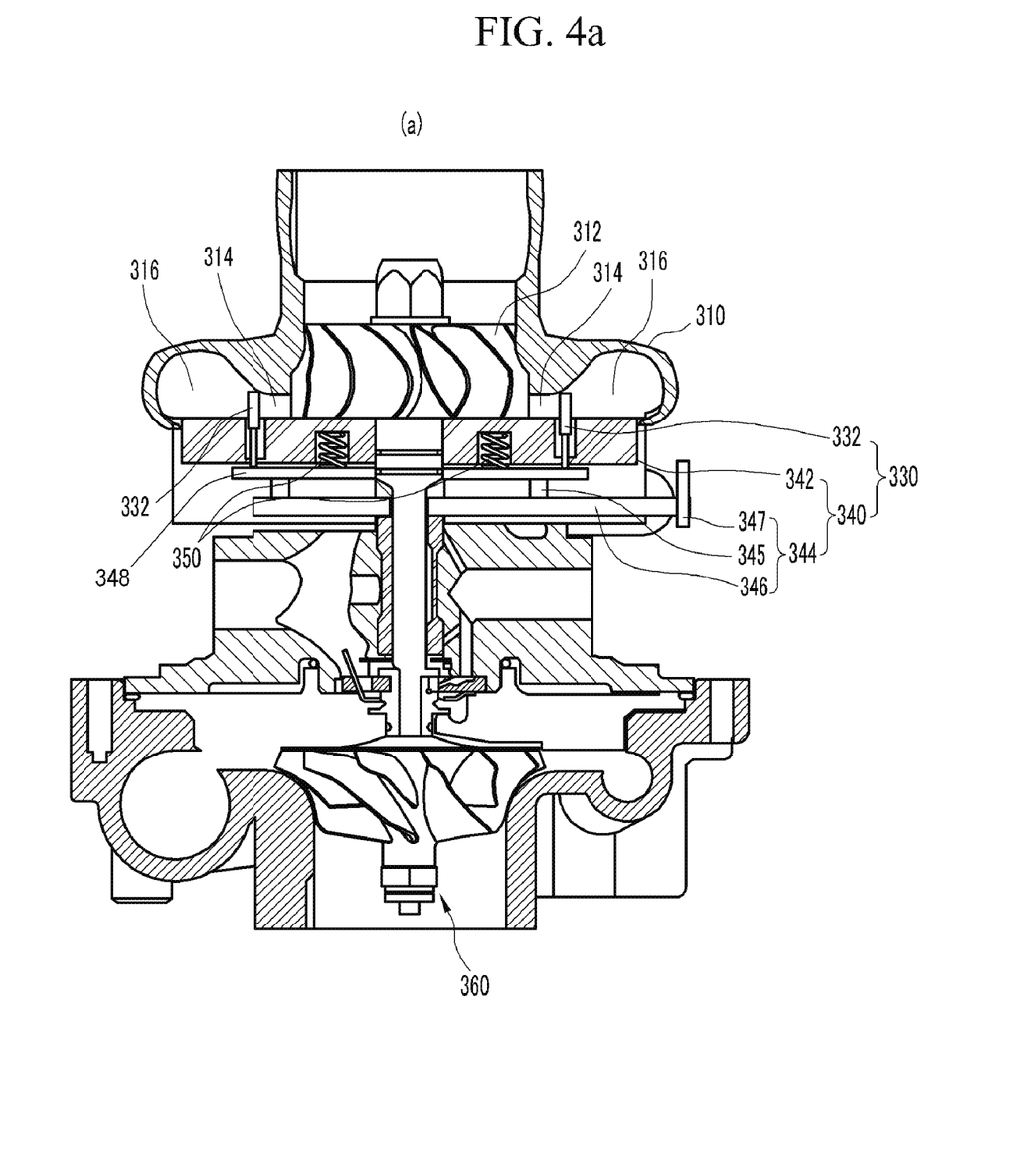
FIG. 4 shows partial cross-sections of the exemplary variable turbocharger according various aspects of the present invention for explaining operations at low speed and high speed.
Figure 4B:
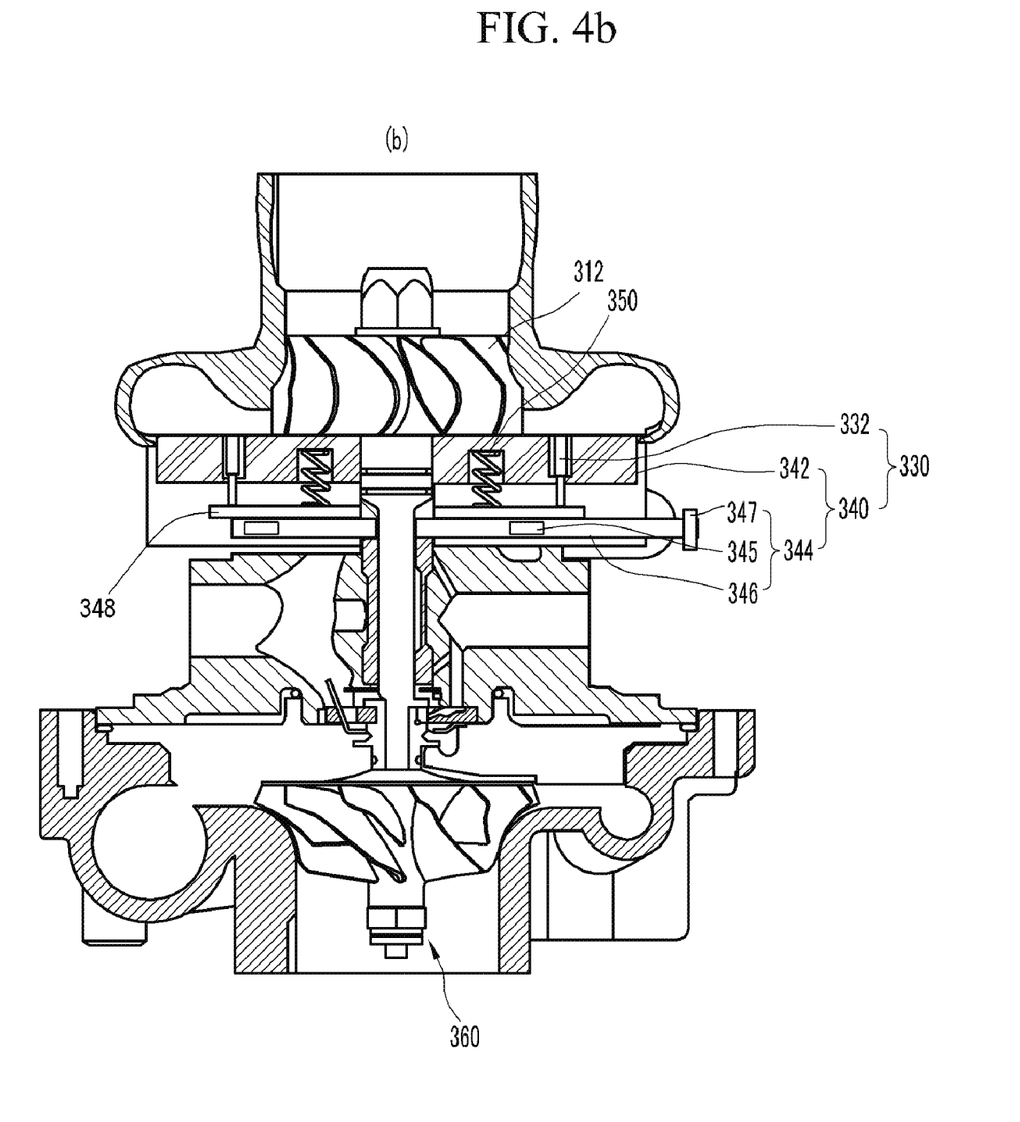

FIG. 3 shows operations of a variable turbocharger according to an exemplary embodiment of the present invention at low speed and high speed, and FIG. 4 shows partial cross-sections of the variable turbocharger according to the exemplary embodiment of the present invention explaining operations at low speed and high speed.

Figure 5:
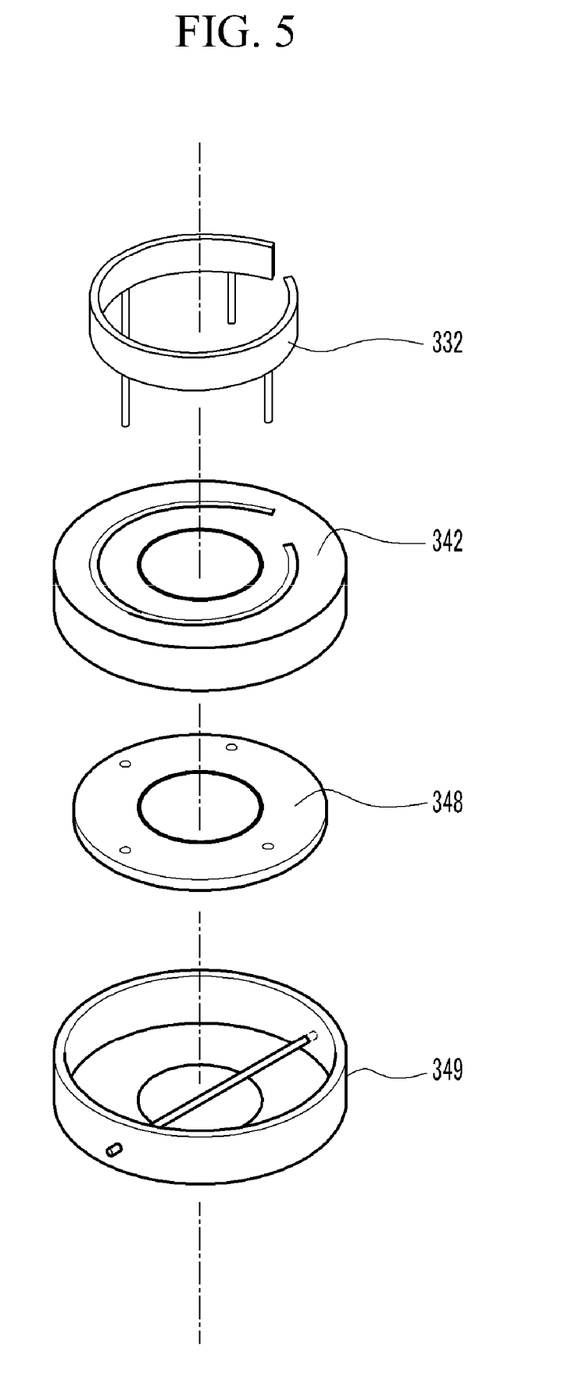
FIG. 5 is a partial exploded view of the exemplary variable turbocharger according to various aspects of the present invention.
Figure 6:
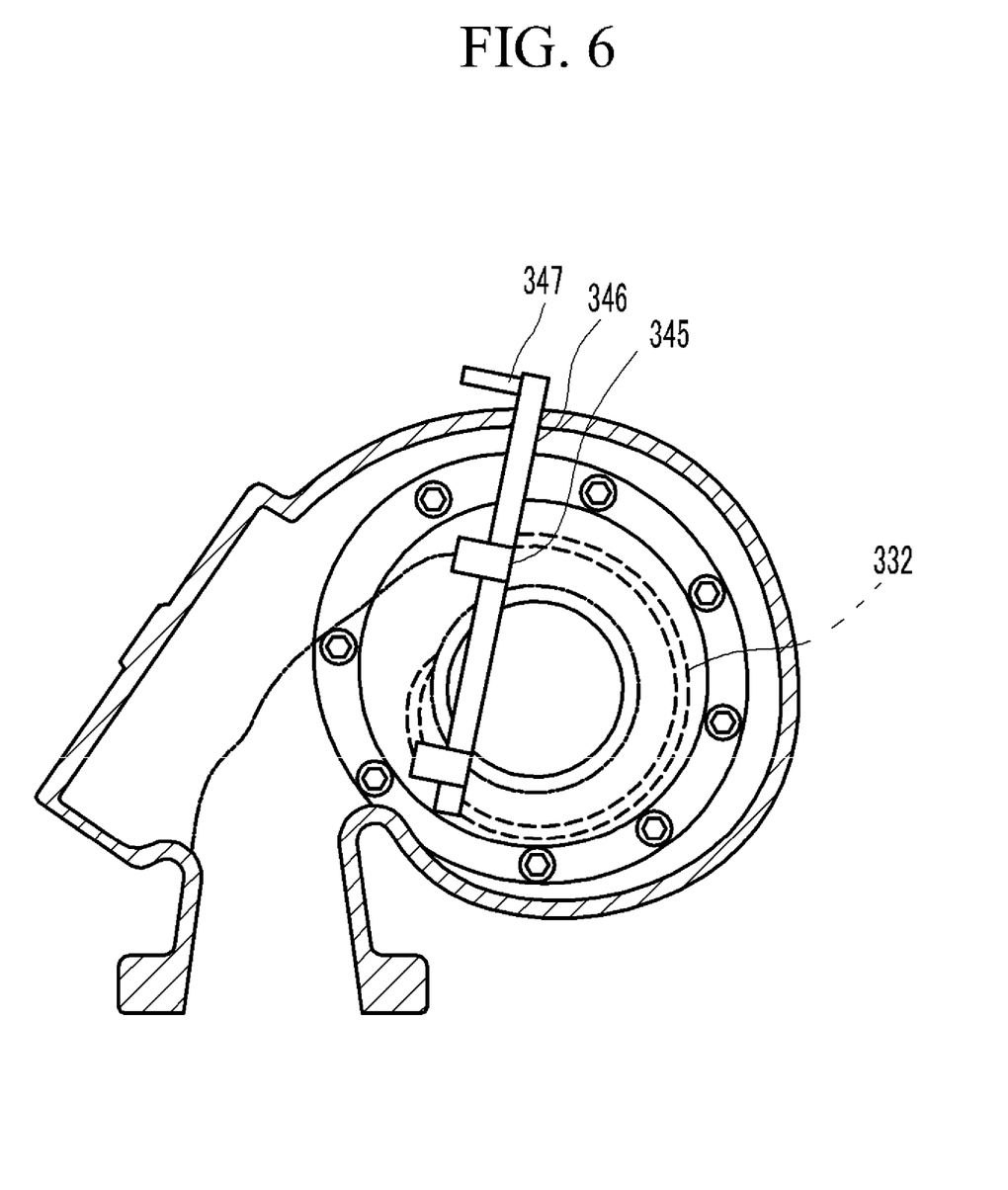
FIG. 6 shows a partition controlling unit of the exemplary variable turbocharger according to various aspects of the present invention.

FIG. 5 is a partial exploded view of the variable turbocharger according to the present invention, and FIG. 6 shows a partition controlling unit of the variable turbocharger.

A variable turbocharger according to an exemplary embodiment of the present invention, as shown in FIG. 3 to FIG. 6, includes a turbine housing 310, a first scroll 314, and a second scroll 316 formed around the first scroll 314, and the first scroll 314 and the second scroll 316 are disposed within the turbine housing 310 for exhaust gas to exhaust via a turbine 312.

The variable turbocharger also includes a partitioning unit 330 for selectively separating the first scroll 314 and the second scroll 316, and a flux control valve 320 disposed to an exhaust gas inflow portion 311 for selectively blocking the exhaust gas to flow into the second scroll 316.

The partitioning unit 330 includes a scroll partition 332 that is selectively inserted between the first scroll 314 and the second scroll 316, and a partition controlling unit 340 for driving the scroll partition 332. By "selectively inserted", it is meant that the scroll partition is disposed between the first scroll and second scroll such that it can direct all or a portion of a flow into the first scroll or second scroll.

The partition controlling unit 340 includes a guide unit 342 for guiding the scroll partition 332 and a controlling link 344 connected with the scroll partition 332 for the scroll partition 332 to move along the guide unit 342.

The controlling link 344 includes a first lever 345 pivotally connected with the scroll partition 332, a second lever 346 connected with the first lever 345, and a third lever 347 connected with the second lever 346, wherein the scroll partition 332 moves according to operation of the third lever 347.

An elastic portion 350 is provided for supplying restoring force to the scroll partition 332.

The scroll partition 332 is disposed such that cross-sections of the first scroll 314 and the second scroll 316 decrease along an inflow direction of the exhaust gas. In other words, the flowpaths along the first scroll and second scroll have decreasing cross-sections.

When the turbine 312 rotates, a compressor 360 connected with the turbine 312 rotates and takes in air.

Hereinafter, referring to FIG. 3 to FIG. 6, operation of the variable turbocharger according to the exemplary embodiments of the present invention will be explained.

FIG. 3 (a) and FIG. 4 (a) illustrate operations of the variable turbocharger according to the exemplary embodiments of the present invention at low speed.

At low speed, the flux control valve 320 of the variable turbocharger is maintained in a closed state, and the scroll partition 332 is maintained in a protruded state for separating the first scroll 314 and the second scroll 316.

At low speed, flux of the exhaust gas is less, and the A/R ratio is less because the exhaust gas inflow cross-section is small and the velocity of the exhaust gas is fast. Thus reaction of the turbine 312 is fast so that turbo lag may be minimized.

The inflowing exhaust gas is prevented from leaking so that energy loss in minimized.

FIG. 3 (*b*) and FIG. 4 (*b*) illustrate operations of the variable turbocharger according to the exemplary embodiments of the present invention at high speed.

At high speed, the flux control valve 320 of the variable turbocharger is maintained in an opened state, and the scroll partition 332 that separates the first scroll 314 and the second scroll 316 at low speed is inserted into the guide unit 342.

At high speed, flux of the exhaust gas is larger, and the A/R ratio is larger because exhaust gas inflow cross-section is large so that output of the turbine 312 is improved.

Also, at high speed, the turbine 312 is turned by the exhaust gas with minimized resistance because there is no obstacle in the scrolls.

FIG. 5 illustrates the scroll partition 332, the guide unit 342, a supporting plate 348 for supporting the scroll partition 332, and a cover 349.

FIG. 6 shows a partition controlling unit of the variable turbocharger according to exemplary embodiments of the present invention.

The first lever 345 is pivotally connected or coupled with the scroll partition 332, the second lever 346 is connected with the first lever 345, and the third lever 347 is connected with the second lever 346, wherein the scroll partition 332 moves according to operation of the third lever 347.

Figure 7:
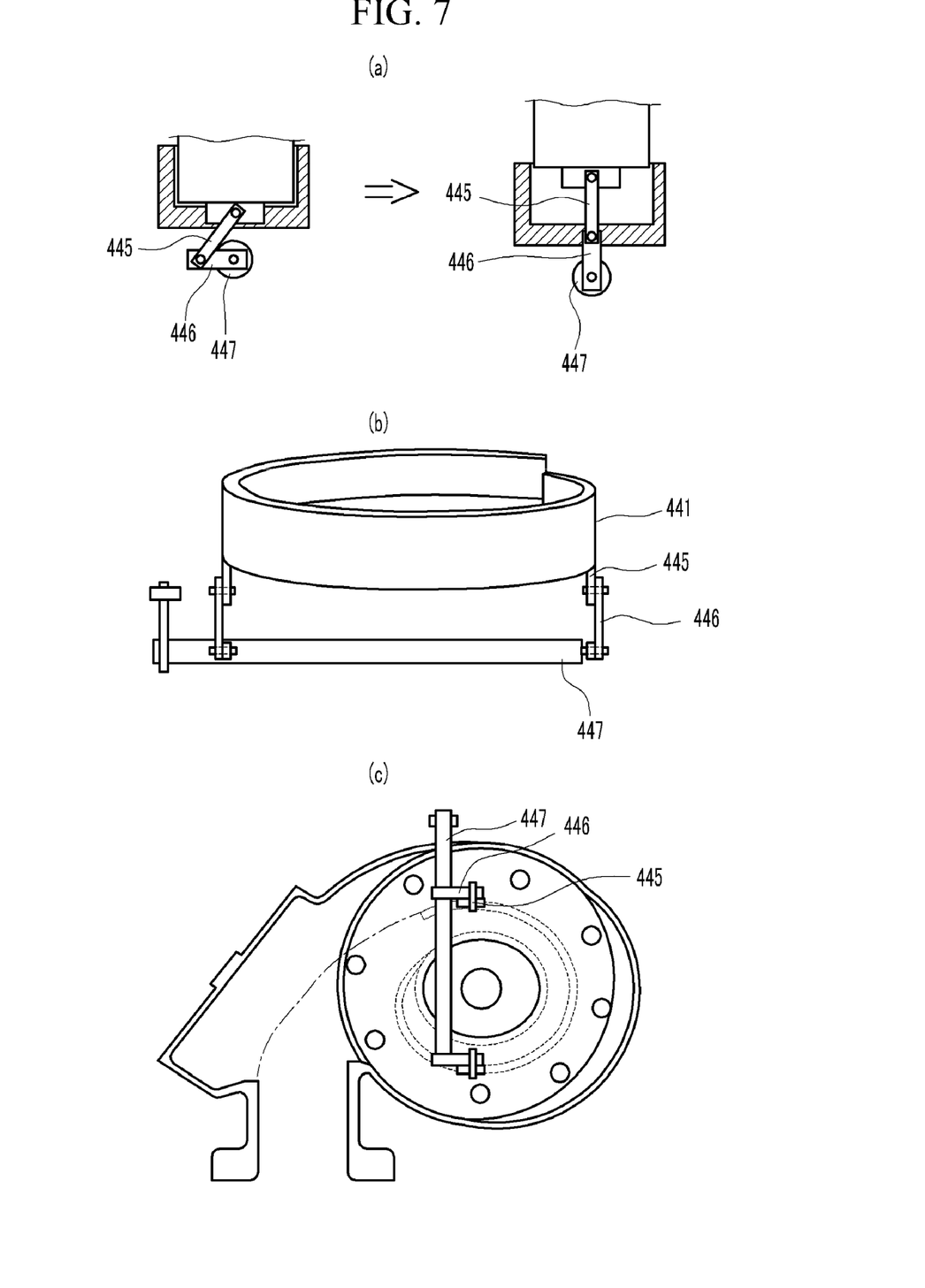
FIG. 7 shows a partition controlling unit of an exemplary variable turbocharger similar to that of FIG. 4.

FIG. 7 shows a partition controlling unit of a variable turbocharger according to various embodiments of the present invention.

FIG. 7 illustrates a first lever 445 pivotally connected with the scroll partition 441, a second lever 446 connected with the first lever 445, and a third lever 447 connected with the second lever 446. The scroll partition 441 moves according to operation of the third lever 447.

Figure 8:
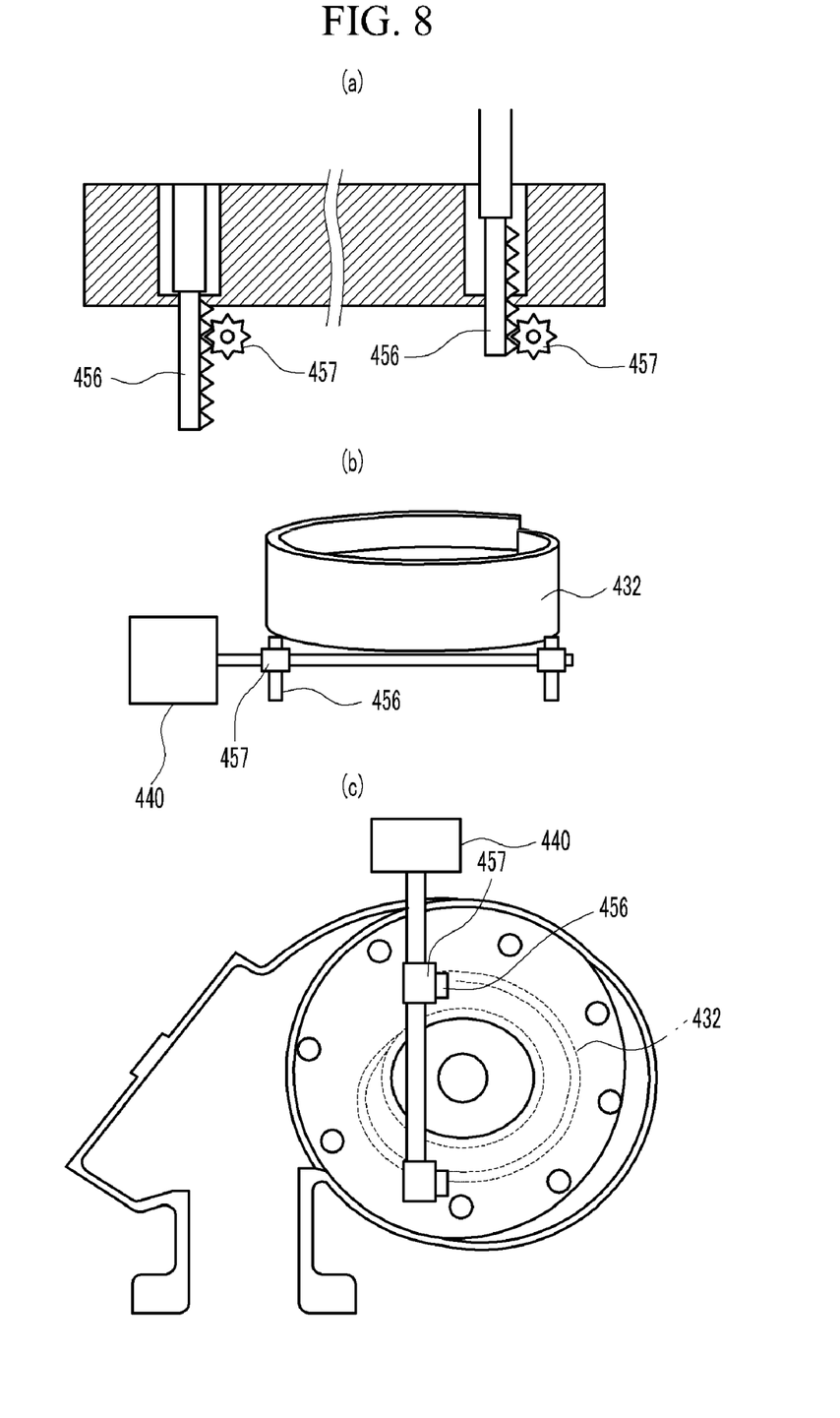
FIG. 8 shows a partition controlling unit of an exemplary variable turbocharger similar to that of FIG. 4.

FIG. 8 shows a partition controlling unit of a variable turbocharger, which is in a lowering state or lifted state according to various embodiments of the present invention.

A variable turbocharger according to the exemplary embodiments of the present invention includes a rack 456 disposed under a scroll partition 432 and a drive gear 457 engaged with the rack 456.

The variable turbocharger according to the exemplary embodiments of the present invention is executed by rotation of the drive gear 457.

The drive gear 457 is operated by an actuator 440, and the actuator 440 may be a motor or so on.

Figure 9:
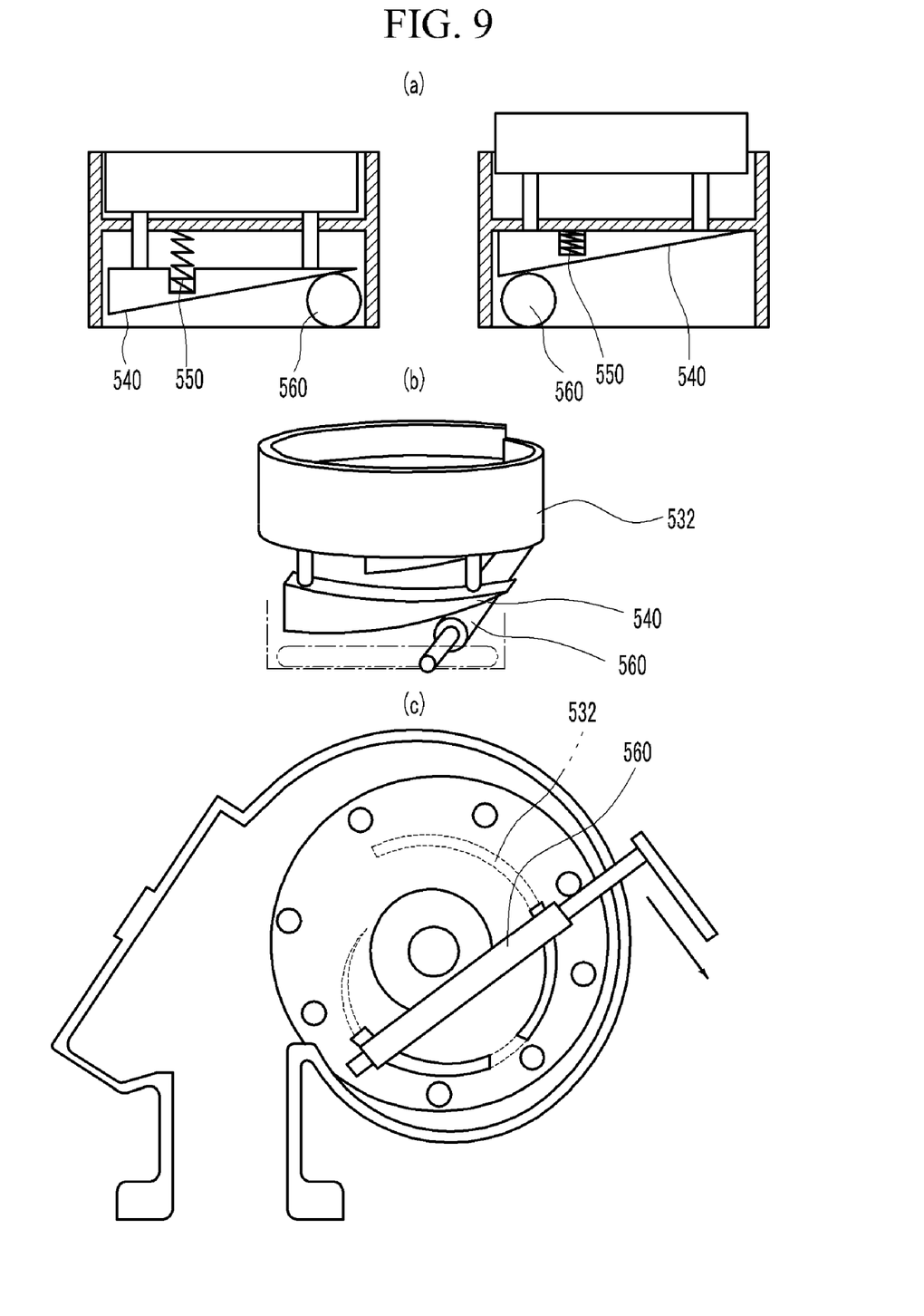
FIG. 9 shows a partition controlling unit of an exemplary variable turbocharger similar to that of FIG. 4.

FIG. 9 shows a partition controlling unit of a variable turbocharger which is in a lowering state or lifted state, according to various exemplary embodiments of the present invention.

A variable turbocharger according to the exemplary embodiments of the present invention includes an inclined unit 540 disposed under the scroll partition 532, and a drive lever 560 that moves along the inclined unit 540 for the scroll partition 432 to move.

An elastic portion 550 is provided to supply restoring force to the scroll partition 532.

The variable turbocharger according to exemplary embodiments of the present invention is operated according to engine speed, and the standards of low or high speed are variable according to requirements of engine performance.

Figure 10:
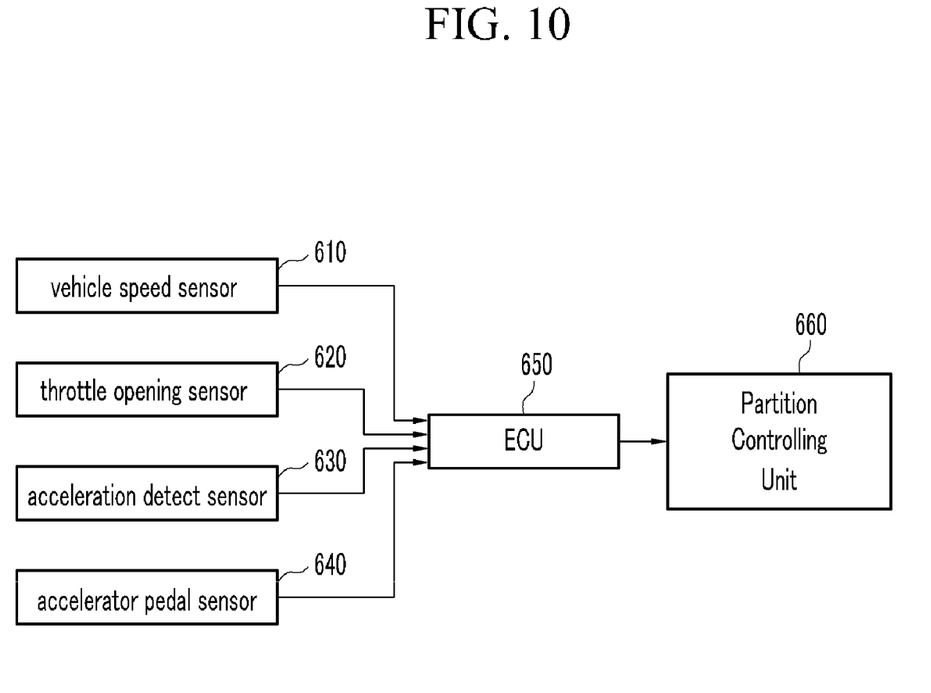
FIG. 10 is a block diagram of a control method for a variable turbocharger according to various aspects of the present invention as shown in FIG. 3.
Figure 11:
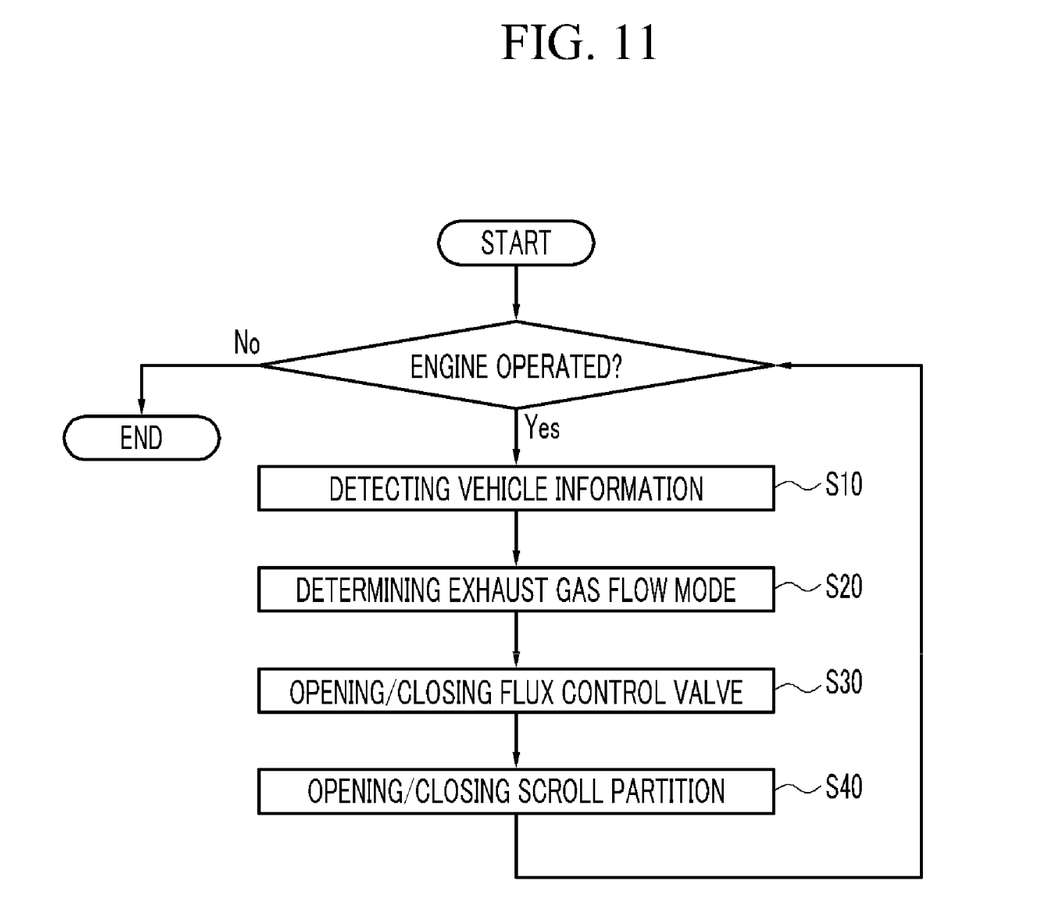
FIG. 11 is a flow chart for explaining the control method for an exemplary variable turbocharger according to various aspects of the present invention as shown in FIG. 3.

FIG. 10 is a block diagram of a control method for a variable turbocharger according to the various embodiments of the present invention, and FIG. 11 is a flow chart for explaining the control method for a variable turbocharger according to the above exemplary embodiments of the present invention.

Referring to FIG. 10 and FIG. 11, a control method for a variable turbocharger according to exemplary embodiments of the present invention will be explained.

A control method for a variable turbocharger according to the above exemplary embodiments of the present invention includes detecting vehicle information S10, determining exhaust gas inflow mode according to the vehicle information S20, opening/closing the flux control valve S30, and opening/closing the scroll partition S40.

The detecting vehicle information S20 uses at least one of a vehicle speed sensor 610, a throttle opening sensor 620, an acceleration detection sensor 630, and an accelerator pedal sensor 640, and is at least one of vehicle speed, throttle opening, acceleration, and accelerator pedal angle.

That is, an ECU (engine control unit) 650 receives information from the sensors, determines exhaust gas inflow mode according to the vehicle information, and controls the variable turbocharger by a partition controlling unit 660.

Standards for determining mode depend on the kind of engine and required performance, and may be selected and executed by a person skilled in the art given the detailed description, so a detailed explanation will be omitted.

The exhaust gas inflow modes include a first mode in which exhaust gas flows through a first scroll and a second mode in which exhaust gas flows through the first scroll and a second scroll.

The opening/closing of the flux control valve S30 includes selectively opening or blocking exhaust gas flowing into the second scroll.

The opening/closing of the scroll partition S40 includes selectively separating the first scroll and the second scroll.

The opening/closing of the flux control valve S30 and the opening/closing of the scroll partition S40 may be simultaneously executed.

The opening/closing of the scroll partition S40 is executed with a partition controlling unit for opening/closing the scroll partition. The partition controlling unit includes a first lever pivotally connected with the scroll partition, a second lever connected with the first lever, and a third lever connected with the second lever, wherein the scroll partition is opened/closed by rotation of the third lever.

Referring to FIG. 7, in a control method for a variable turbocharger according to the present invention the partition controlling unit includes a first lever pivotally connected with the scroll partition, a second lever pivotally connected with the first lever, and a third lever pivotally connected with the second lever, wherein the scroll partition is opened/closed by rotation of the third lever.

Referring to FIG. 8, in a control method for a variable turbocharger according to the present invention the opening/closing of the scroll partition S40 is executed with a partition controlling unit for opening/closing the scroll partition. The partition controlling unit includes a rack disposed under the scroll partition and a drive gear engaged with the rack, wherein the scroll partition is opened/closed by rotation of the drive gear.

Referring to FIG. 9, in a control method for a variable turbocharger according to the present invention the opening/closing of the scroll partition S40 is executed with a partition controlling unit for opening/closing the scroll partition. The partition controlling unit includes an inclined unit disposed under the scroll partition and a drive lever moving along the inclined unit, wherein the scroll partition is opened/closed by movement of the drive lever.

In the control method for a variable turbocharger according to various embodiments of the present invention, repeated description of components of the variable turbocharger that were described according to previous exemplary embodiments of the present invention are omitted.

For convenience in explanation and accurate definition in the appended claims, the terms "up" or "upper", "down" or "lower", "front" or "rear", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for a variable turbocharger comprising:
    detecting vehicle information;
    determining an exhaust gas inflow mode based on the vehicle information;
    opening/closing a flux control valve; and
    opening/closing a scroll partition;
    wherein the opening/closing of the scroll partition selectively separates the first scroll and the second scroll;
    wherein the opening/closing of the scroll partition and the opening/closing of the flux control valve are simultaneously executed; and
    wherein the opening/closing of the scroll partition is executed with a partition controlling unit for opening/closing the scroll partition, further wherein the partition controlling unit comprises:
    a first lever pivotally coupled to the scroll partition;
    a second lever connected to the at least a first lever; and
    a third lever connected to the second lever,
    wherein the scroll partition is opened/closed by rotation of the third lever.

2. The control method for a variable turbocharger of claim 1, wherein the detecting of the vehicle information includes detecting at least one of vehicle speed, throttle opening, acceleration, and accelerator pedal angle.

3. The control method for a variable turbocharger of claim 1, wherein the exhaust gas inflow mode comprises:
    a first mode in which exhaust gas flows through a first scroll; and
    a second mode in which exhaust gas flows through the first scroll and a second scroll.

4. The control method for a variable turbocharger of claim 1, wherein the opening/closing of the flux control valve selectively blocks exhaust gas from flowing into the second scroll.

5. A control method for a variable turbocharger comprising:
    detecting vehicle information;
    determining an exhaust gas inflow mode based on the vehicle information;
    opening/closing a flux control valve; and
    opening/closing a scroll partition;
    wherein the opening/closing of the scroll partition selectively separates the first scroll and the second scroll;
    wherein the opening/closing of the scroll partition and the opening/closing of the flux control valve are simultaneously executed; and
    wherein the opening/closing of the scroll partition is executed with a partition controlling unit for opening/closing the scroll partition, further wherein the partition controlling unit comprises:
    at least a first lever pivotally coupled to the scroll partition;
    a second lever pivotally connected with the at least a first lever; and
    a third lever pivotally connected with the second lever,
    wherein the scroll partition is opened/closed by rotation of the third lever.

6. A control method for a variable turbocharger comprising:
    detecting vehicle information;
    determining an exhaust gas inflow mode based on the vehicle information;
    opening/closing a flux control valve; and
    opening/closing a scroll partition;
    wherein the opening/closing of the scroll partition selectively separates the first scroll and the second scroll;
    wherein the opening/closing of the scroll partition and the opening/closing of the flux control valve are simultaneously executed; and
    wherein the opening/closing scroll partition is executed with a partition controlling unit for opening/closing the scroll partition, further wherein the partition controlling unit comprises:
    a rack disposed under the scroll partition; and
    a drive gear engaged with the rack,
    wherein the scroll partition is opened/closed by rotation of the drive gear.

* * * * *